United States Patent
Wang et al.

(10) Patent No.: US 10,439,672 B2
(45) Date of Patent: Oct. 8, 2019

(54) METHODS FOR SIGNALING OR RECEIVING CELL IDENTITY, NETWORK IDENTITY, AND FREQUENCY HOPPING PATTERNS

(71) Applicant: Telefonaktiebolaget LM Ericsson (publ), Stockholm (SE)

(72) Inventors: Yi-Pin Eric Wang, Fremont, CA (US); Cagatay Capar, Cukurova/Adana (TR); Jung-Fu Cheng, Fremont, CA (US); Havish Koorapaty, Saratoga, CA (US); Xingqin Lin, San Jose, CA (US); Amitav Mukherjee, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/693,054

(22) Filed: Aug. 31, 2017

(65) Prior Publication Data

US 2018/0062698 A1 Mar. 1, 2018

Related U.S. Application Data

(60) Provisional application No. 62/382,459, filed on Sep. 1, 2016.

(51) Int. Cl.
*H04B 1/713* (2011.01)
*H04W 8/28* (2009.01)
(Continued)

(52) U.S. Cl.
CPC .......... *H04B 1/713* (2013.01); *H04B 1/7143* (2013.01); *H04W 8/28* (2013.01); *H04W 4/70* (2018.02);
(Continued)

(58) Field of Classification Search
CPC ....... H04B 1/713; H04B 1/7143; H04W 8/28; H04W 4/70; H04W 36/0083; H04W 48/12; H04W 64/003
See application file for complete search history.

(56) References Cited

U.S. PATENT DOCUMENTS

2002/0067758 A1* 6/2002 D'Amico .............. H04L 1/0061
375/132
2006/0068782 A1* 3/2006 Kuriyama ............. H04W 48/16
455/434
(Continued)

FOREIGN PATENT DOCUMENTS

| EP | 2270995 A1 | 1/2011 |
|---|---|---|
| WO | 2008033985 A2 | 3/2008 |
| WO | 2011041552 A1 | 4/2011 |

OTHER PUBLICATIONS

L. Korowajczuk "What LTE Parameters need to be Dimensioned and Optmized", pp, 1-151. Aug. 4, 2014.*
(Continued)

*Primary Examiner* — Sophia Vlahos
(74) *Attorney, Agent, or Firm* — Withrow & Terranova, PLLC (57) ABSTRACT

Systems and methods for signaling or receiving cell identity, network identity, and/or Frequency Hopping (FH) patterns are disclosed. In some embodiments, a method of operating a wireless device in a wireless communication network includes obtaining a signal transmitted from a network node and determining a physical cell identifier, ID, of the network node based on the signal. The method also includes determining a FH pattern of the network node based on the determined physical cell ID of the network node. In this manner, the wireless device can efficiently determine the FH (Continued)

pattern used and may be able to determine if the wireless device should connect to the network node.

26 Claims, 11 Drawing Sheets

(51) Int. Cl.
    *H04B 1/7143*     (2011.01)
    *H04W 4/70*     (2018.01)
    *H04W 36/00*     (2009.01)
    *H04W 48/12*     (2009.01)
    *H04W 64/00*     (2009.01)

(52) U.S. Cl.
    CPC ........ *H04W 36/0083* (2013.01); *H04W 48/12* (2013.01); *H04W 64/003* (2013.01)

(56) References Cited

U.S. PATENT DOCUMENTS

| | | | | |
|---|---|---|---|---|
| 2009/0036098 A1* | 2/2009 | Lee | ................. | H04W 48/20 455/411 |
| 2011/0294529 A1* | 12/2011 | Luo | ................. | H04L 5/0035 455/509 |
| 2016/0050657 A1* | 2/2016 | Kishiyama | ............ | H04L 5/0053 370/329 |
| 2016/0081127 A1* | 3/2016 | Lee | ................. | H04W 76/10 709/228 |
| 2016/0295345 A1* | 10/2016 | Oh | ............ | H04W 4/70 |
| 2016/0345118 A1* | 11/2016 | Oh | ............ | H04W 4/70 |
| 2017/0013466 A1* | 1/2017 | Xu | ............ | H04L 1/1893 |
| 2017/0288848 A1* | 10/2017 | Lei | ............ | H04W 4/70 |
| 2018/0020441 A1* | 1/2018 | Lo | ............ | H04W 76/14 |
| 2018/0213468 A1* | 7/2018 | Chatterjee | ............ | H04L 5/0053 |

OTHER PUBLICATIONS

International Search Report and Written Opinion for International Patent Application No. PCT/IB2017/055251, dated Jan. 3, 2018, 13 pages.

International Preliminary Report on Patentability for International Patent Application No. PCT/IB2017/055251, dated Sep. 20, 2018, 7 pages.

* cited by examiner

METHODS FOR SIGNALING OR RECEIVING CELL IDENTITY, NETWORK IDENTITY, AND FREQUENCY HOPPING PATTERNS

RELATED APPLICATIONS

This application claims the benefit of provisional patent application Ser. No. 62/382,459, filed Sep. 1, 2016, the disclosure of which is hereby incorporated herein by reference in its entirety.

TECHNICAL FIELD

The present disclosure relates to a method for signaling or receiving cell identity, network identity, and/or frequency hopping patterns.

BACKGROUND

The Internet of Things (IoT) is a vision for the future world where everything that can benefit from a connection will be connected. Cellular technologies are being developed or evolved to play an indispensable role in the IoT world, particularly the machine type communication (MTC). MTC is characterized by lower demands on data rates than, for example, mobile broadband, but with higher requirements on, e.g., low cost device design, better coverage, and ability to operate for years on batteries without charging or replacing the batteries. To meet the IoT design objectives, Third Generation Partnership Project (3GPP) has standardized Narrowband IoT (NB-IoT) in Release (Rel) 13 that has a system bandwidth of 180 kilohertz (kHz) and targets improved coverage, long battery life, low complexity communication design, and network capacity that is sufficient for supporting a massive number of devices.

To further increase the market impact of NB-IoT, extending its deployment mode to unlicensed band operation is being considered. For example, in the United States of America (US), the 915 megahertz (MHz) and 2.4 gigahertz (GHz) Industrial, Scientific and Medical (ISM) bands may be considered. However, an unlicensed band has specific regulations to ensure different systems can co-exist in the band with good performance and fairness. This requires certain modifications to Rel-13 NB-IoT for it to comply with the regulations. In the aforementioned US ISM bands, it is advantageous to adopt frequency hopping (FH) so that a transmitter can transmit at a higher power level without power spectral density (PSD) limitation or requiring listen-before-talk (LBT). When FH is adopted, a User Equipment (UE) needs to learn the hopping pattern employed by the eNB of the cell before it can start actual communication.

SUMMARY

Systems and methods for signaling or receiving cell identity, network identity, and/or Frequency Hopping (FH) patterns are disclosed. In some embodiments, a method of operating a wireless device in a wireless communication network includes obtaining a signal transmitted from a network node and determining a physical cell identifier (ID) of the network node based on the signal. The method also includes determining a FH pattern of the network node based on the determined physical cell ID of the network node. In this manner, the wireless device can efficiently determine the FH pattern used and may be able to determine if the wireless device should connect to the network node.

In some embodiments, determining the FH pattern based on the physical cell ID includes determining the FH pattern based on each physical cell ID corresponding to a unique FH pattern. In some embodiments, there are 504 possible physical cell IDs and 504 corresponding FH patterns.

In some embodiments, determining the FH pattern based on the physical cell ID includes determining the FH pattern based on at least two physical cell IDs corresponding to the same FH pattern. In some embodiments, determining the FH pattern based on the physical cell ID includes determining m % K=k where m is the physical cell ID, K is a number of unique FH patterns, and k is the FH pattern associated with the physical cell ID.

In some embodiments, the method also includes determining a network ID of the network node based on the signal obtained from the network node and, in response to determining that the network ID is part of a network able to be accessed by the wireless device, determining the FH pattern based on the physical cell ID and the network ID.

In some embodiments, the method also includes, in response to determining that the network ID is not part of a network able to be accessed by the wireless device, refraining from receiving a System Information Block (SIB) from the network node.

In some embodiments, determining the FH pattern based on the physical cell ID includes determining the FH pattern based on the physical cell ID and a predefined network ID for the wireless device; and the method also includes, in response to determining that the determined FH pattern matches the FH pattern of the network node, determining that the network node is part of a network able to be accessed by the wireless device.

In some embodiments, the method also includes, in response to determining that the determined FH pattern does not match the FH pattern of the network node, refraining from receiving a SIB from the network node.

In some embodiments, obtaining the signal transmitted from a network node includes obtaining a Master Information Block (MIB) that includes the network ID of the network node.

In some embodiments, obtaining the signal transmitted from the network node includes obtaining a Narrowband Secondary Synchronization Signal (NSSS) used in an unlicensed spectrum. In some embodiments, obtaining the signal transmitted from the network node includes obtaining the signal in the 2.4 gigahertz (GHz) Industrial, Scientific, and Medical (ISM) band. In some embodiments, obtaining the signal transmitted from the network node includes obtaining the signal in the 915 MHz ISM band.

In some embodiments, a wireless device includes at least one processor and memory. The memory contains instructions whereby the wireless device is operative to obtain a signal transmitted from a network node in a wireless communication network; determine a physical cell ID of the network node based on the signal obtained from the network node; and determine a FH pattern of the network node based on the determined physical cell ID of the network node.

In some embodiments, methods of signaling or receiving Cell Identity, Network Identity, and FH patterns for NB-IoT operation in an unlicensed band are disclosed. The proposed methods build on the signaling capability of a Rel-13 NB-IoT NSSS, which supports 504 Physical Cell Identities (PCIDs). In some embodiments, each PCID is mapped to one unique FH pattern. In some embodiments, the FH pattern is also determined by the PCID; however, the same hopping patterns may be shared by one or more PCIDs. In some embodiments, the FH pattern is determined by both PCID and Network Identifier (NetID). This allows the UE to identify whether a cell belongs to its own operator during an early phase of the initial acquisition. In some embodiments, the FH pattern is not determined by the NetID, but the NetID is carried in the MIB instead of the legacy SIB. This still allows the UE to identify whether the acquired cell belongs to its subscribed network. Combinations of one or more embodiments described above may also be used.

Using one or more of the embodiments disclosed herein may allow the UE to acquire FH patterns during the early phase of the initial acquisition process and/or determine whether an acquired cell belongs to its operator during the early phase of the initial acquisition process. Some embodiments reuse Rel-13 NB-IoT NSSS waveforms while addressing the important considerations of unlicensed band operation.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any two or more embodiments described in this document may be combined in any way with each other. Furthermore, even though the examples herein are given in the Internet of Things (IoT) context, the embodiments described herein are not limited to IoT and can also apply in a more general case when a network node or User Equipment (UE) may need to signal or receive Cell Identity, Network Identity, and/or Frequency Hopping (FH) patterns. In some embodiments, a non-limiting term "UE" is used. The UE herein can be any type of wireless device capable of communicating with network node or another UE over radio signals. The UE may also be a radio communication device, a target device, a Device-to-Device (D2D) UE, a machine type UE, a UE capable of Machine-to-Machine communication (M2M), a sensor equipped with UE, iPad, Tablet, mobile terminal, smart watch, wearable, smart phone, Laptop Embedded Equipment (LEE), Laptop Mounted Equipment (LME), Universal Serial Bus (USB) dongle, Customer Premises Equipment (CPE), etc.

Also in some embodiments, generic terminology "network node" is used. It can be any kind of network node which may be comprised of a radio network node such as a base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, Self-Organizing Network (SON) node, a coordinating node, etc.), or even an external node (e.g., $3^{rd}$ party node, a node external to the current network), etc.

The term "radio node" used herein may be used to denote a UE or a radio network node.

The embodiments are applicable to single carrier as well as to multicarrier or Carrier Aggregation (CA) operation of the UE in which the UE is able to receive and/or transmit data to more than one serving cells. The term Carrier Aggregation (CA) is also called (e.g. interchangeably called) "multi-carrier system," "multi-cell operation," "multi-carrier operation," "multi-carrier transmission," and/or reception. In CA, one of the Component Carriers (CCs) is the Primary Component Carrier (PCC) or simply primary carrier or even anchor carrier. The remaining ones are called Secondary Component Carrier (SCC) or simply secondary carriers or even supplementary carriers. The serving cell is interchangeably called as Primary Cell (PCell) or Primary Serving Cell (PSC). Similarly the secondary serving cell is interchangeably called as Secondary Cell (SCell) or Secondary Serving Cell (SSC).

The term "signaling" used herein may comprise any of: high-layer signaling (e.g., via Radio Resource Control (RRC)), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term "signal transmission" used herein may refer to a certain type of periodic signals that is transmitted by the network node in downlink or by the UE in the uplink. The signal transmission may comprise a physical signal or a physical channel or both. The physical signal does not carry higher layer information, whereas the physical channel carries higher layer information. These signals are used by the network node and/or by the UE for performing one or more operations.

Figure 1:
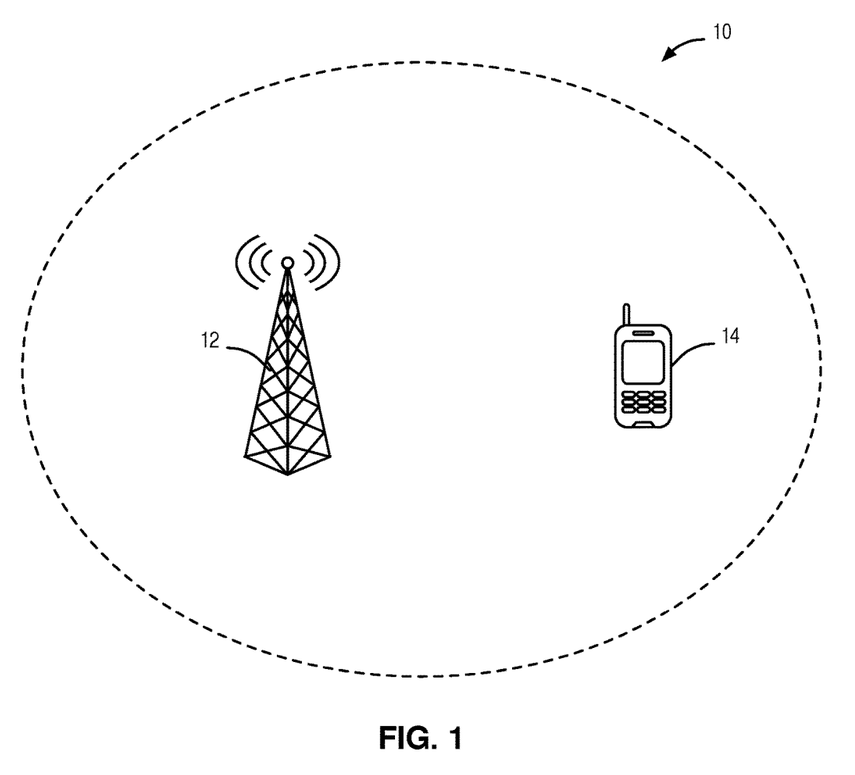
FIG. 1 illustrates a cellular communications network, according to some embodiments of the present disclosure.

FIG. 1 illustrates a wireless communications network 10 in which embodiments of the present disclosure can be implemented. In some embodiments, the wireless communications network 10 includes a Radio Access Network (RAN) (e.g., an Evolved Universal Mobile Telecommunications System (UMTS) Radio Access Network (E-UTRAN) for Long Term Evolution (LTE)) including at least one base station 12 (sometimes referred to herein as "network node 12") providing a cell of the wireless communications network 10. The network node 12 provides radio access to a UE 14 located within the respective cell. The network node 12 may be communicatively coupled via a base station to a base station interface (e.g., an X2 interface in LTE), to another base station, or to another network node. Further, in some embodiments, the network node 12 is connected to a core network (e.g., an Evolved Packet Core (EPC) in LTE) via corresponding interfaces (e.g., S1 interfaces in LTE). The core network includes various core network nodes such as, e.g., Mobility Management Entities (MMEs), Serving Gateways (S-GWs), and Packet Data Network (PDN) Gateways (P-GWs), as will be appreciated by one of ordinary skill in the art.

Narrowband Internet of Things (NB-IoT) is a radio-access technology introduced in Third Generation Partnership Project (3GPP) Release (Rel)-13 targeting specifically the IoT and Machine Type Communication (MTC) use cases. It has a system bandwidth of 180 kHz and achieves improved coverage, long battery life, and network capacity that is sufficient for supporting a massive number of devices. It further allows low complexity communication design and facilitates low UE 14 module cost.

Currently, extending NB-IoT deployment to unlicensed band operation is being considered. For example, in the United States of America (US), the 915 MHz and 2.4 GHz Industrial, Scientific, and Medical (ISM) bands may be considered. The 915 MHz ISM band in the US spans over 902-926 MHz, and the 2.4 GHz ISM band starts from 2.4 GHz and goes up to 2.4835 GHz. However, an unlicensed band has specific regulations to ensure different systems can co-exist in the band with good performance and fairness. This requires certain modifications of the Rel-13 NB-IoT for it to comply with the regulations. In the aforementioned US ISM bands, it is advantageous to adopt Frequency Hopping (FH) so that a transmitter can transmit at a higher power level without Power Spectral Density (PSD) limitation or requiring Listen-Before-Talk (LBT).

Figure 2A:
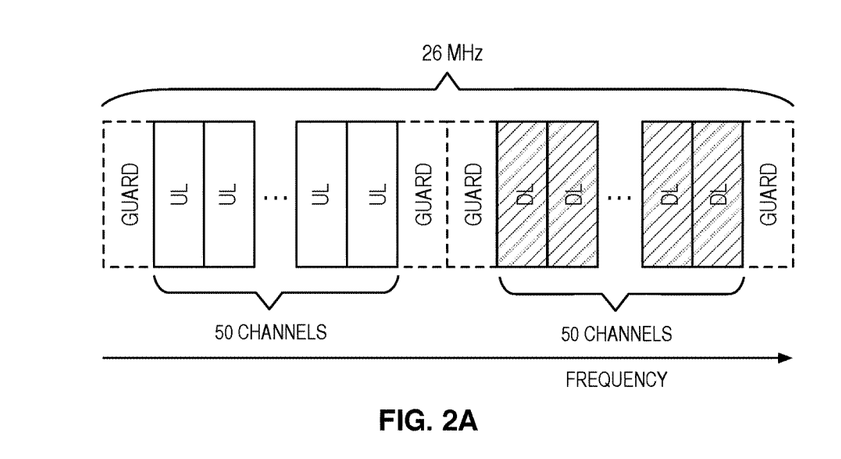
FIGS. 2A and 2B illustrate channel definitions suitable for Narrowband Internet of Things (NB-IoT) implementations, according to some embodiments of the present disclosure.
Figure 2B:
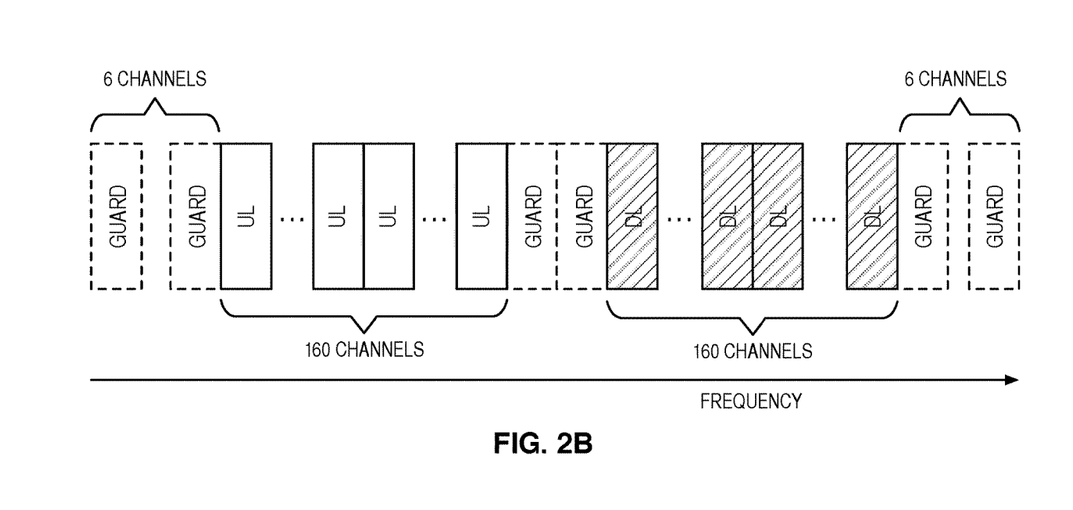

The Federal Communications Commission (FCC) regulations state that a transmitter transmitting a signal of with a 20 decibel (dB) bandwidth smaller than 250 kHz may use 36 dBm Equivalent Isotropically Radiated Power (EIRP) if hopping over 50 (or greater) and 75 (or greater) frequency channels in the 915 MHz and 2.4 GHz ISM bands, respectively. FIG. 2A shows an example of channel definition suitable for NB-IoT in the US 902-928 MHz ISM band. Each channel occupies 250 kHz of bandwidth. In this example, there are 50 Uplink (UL) channels and 50 Downlink (DL) channels. FIG. 2B shows an example of a channel definition suitable for NB-IoT in the US 2.4-2.4835 GHz ISM band. Each channel occupies 250 kHz of bandwidth. In this example, there are 160 UL channels and 160 DL channels.

The embodiments below use N as the number of hopping channels. FCC regulations further state that the average dwell time on any of the hopping channels needs to be lower than 1/N. The hopping pattern may be a repetitive one based on a pseudo random hopping pattern Q in a hopping cycle that consists of N hopping channels:

$$Q=(f_1, f_2, \ldots, f_N), f_i \in \{0, \ldots, N-1\}$$

where each hopping channel is represented by an integer from 0 to N−1.

When FH is adopted, it is essential that the hopping pattern used in a cell is signaled to the UE 14 so that the UE 14 and network node 12 are in perfect synchronism regarding which hopping channel is used at any given time. Some embodiments included herein reuse the Rel-13 NB-IoT Narrowband Secondary Synchronization Signal (NSSS) waveforms. To differentiate from Rel-13 NB-IoT, this disclosure adds a suffix "U" when describing the version of NB-IoT that is intended for unlicensed band operation. For example, NB-IoT-U represents such a system, and PCID-U is the Physical Cell ID of a NB-IoT-U cell. Also, while some embodiments refer to values of the PCID or the PCID-U and refer to the values being obtained from a NSSS or NSSS-U waveform, these are merely some examples and the current disclosure is not limited thereto. The value may be obtained through other types of waveforms or signaling and may be called something other than PCID-U.

Figure 3:
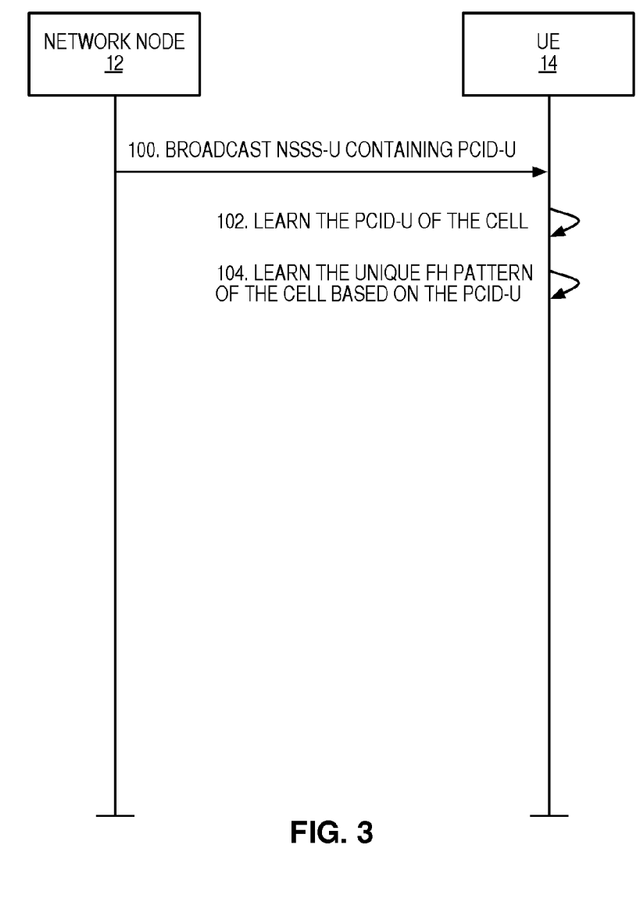
FIGS. 3 through 7 illustrate processes for determining parameters of a cell, according to some embodiments of the present disclosure.

FIG. 3 illustrates processes for determining parameters of a cell according to some embodiments of the present disclosure. In NB-IoT, NSSS is used to signal the cell ID and the 80-ms framing information. 504 PCIDs can be supported, each mapped to specific NSSS waveforms. In some embodiments, illustrated in FIG. 3, NSSS-U adopts the same waveforms as NSSS and also supports 504 PCID-Us. The network node 12 broadcasts a NSSS-U containing the PCID-U of the cell (step 100). By detecting the NSSS-U, the UE 14 learns the PCID-U of the cell (step 102). In this embodiment, there are 504 FH patterns and each PCID-U is mapped to a unique FH pattern. Thus, after the UE 14 learns the PCID-U from NSSS-U, the UE 14 knows the FH pattern (step 104).

Figure 4:
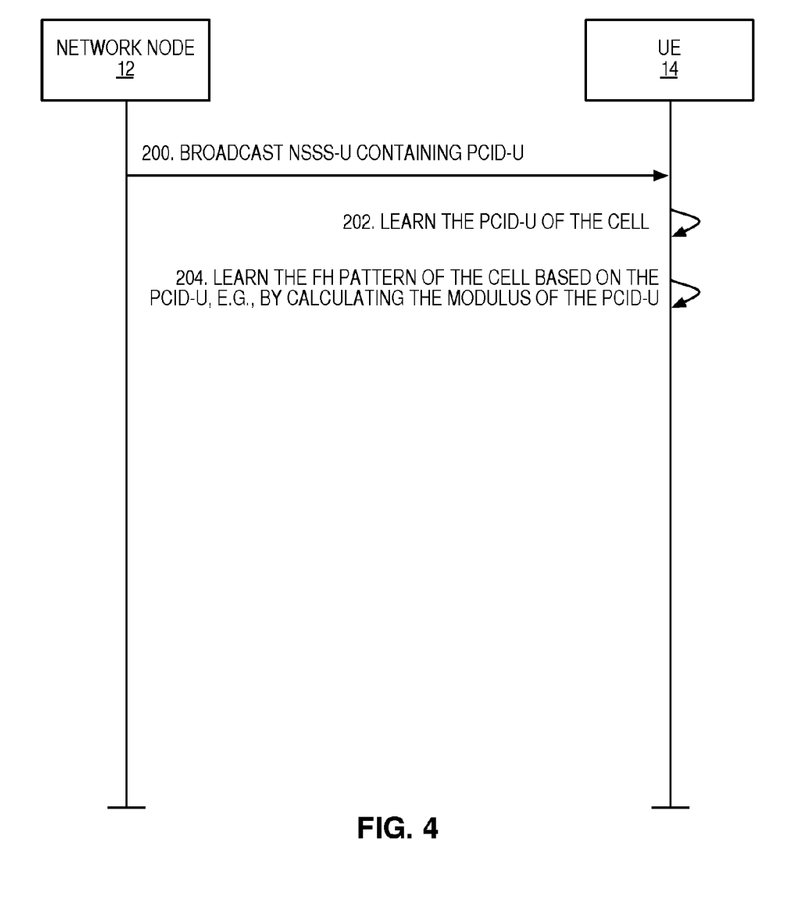

FIG. 4 illustrates processes for determining parameters of a cell according to some embodiments of the present disclosure. In some embodiments, illustrated in FIG. 4, NSSS-U adopts the same waveforms as NSSS and also supports 504 PCID-Us. The network node 12 broadcasts a NSSS-U containing the PCID-U of the cell (step 200). By detecting the NSSS-U, the UE 14 learns the PCID-U of the cell (step 202). In these embodiments, there are K hopping patterns, K<504, and one hopping pattern is shared by multiple PCID-Us. For example, hopping pattern k, $0 \le k \le K-1$ is used by PCID-U m, $0 \le m \le 503$, if the remainder of m divided by K is equal to k, i.e., m % K=k. As discussed above, once the UE 14 knows PCID-U, it figures out the FH pattern (step 204). This formula for the relationship is merely an example. Any other suitable function to determine which FH pattern is used based on the PCID-U could also be used.

In some embodiments, the FH pattern is determined by both PCID-U and Network Identifier (NetID-U). NetID is similar to the Public Land Mobile Network (PLMN) ID. It is used to identify the mobile operator providing services in the cell. Unlike the licensed band operation, NB-IoT-U may be deployed by multiple operators in the same region using the same portion of the unlicensed spectrum. In an NB-IoT network, a UE 14 in extreme coverage-limited condition may take up to a few minutes to acquire the complete system information. In this case, it is important that the UE 14 identifies whether a cell belongs to its own operator early on during the initial acquisition process.

Figure 5:
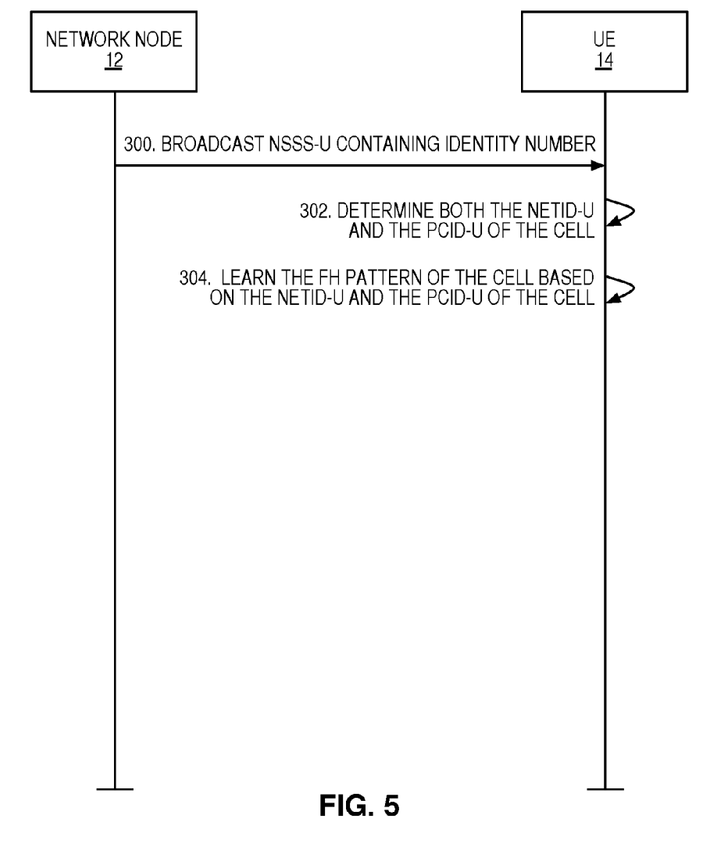

FIG. 5 illustrates processes for determining parameters of a cell according to some embodiments of the present disclosure. For example, the waveforms corresponding to the 504 PCIDs signaled in NSSS can be mapped to 504 different combinations of NetID-U and PCID-U. Assume $M_1$ NetID-U can be supported and each supports $M_2=504/M_1$ PCID-U. The NetID-U, $m_1$, and PCID-U, $m_2$, can be determined based on the identity number, ID, 0, 1, . . . , or 503, carried in NSSS waveform, $$m_1 = \left\lfloor \frac{ID}{M_2} \right\rfloor$$

$$m_2 = ID \% M_2$$

The above formulas are merely one example and the current disclosure is not limited thereto. Any one-to-one mapping from PCID-U to ($m_1$, $m_2$) could be used.

As shown in FIG. 5, the network node 12 broadcasts a NSSS-U containing the identity number of the cell (step 300). The UE 14 determines both the NetID-U and the PCID-U of the cell (step 302). In this case, the UE 14 learns whether the NSSS-U is transmitted from a cell in its operator's network through detecting the NetID-U carried in the NSSS-U. If the NetID-U does not match its operator's identity, the UE 14 shall continue searching for synchronization signal until when a NSSS-U that carries a NetID-U matching its operator's identity is found.

The hopping pattern is determined jointly by NetID-U, $m_1$, and PCID-U, $m_2$ (step 304). There could be 504 hopping patterns, each corresponding to one combination of NetID-U $m_1$ and PCID-U $m_2$.

Figure 6:
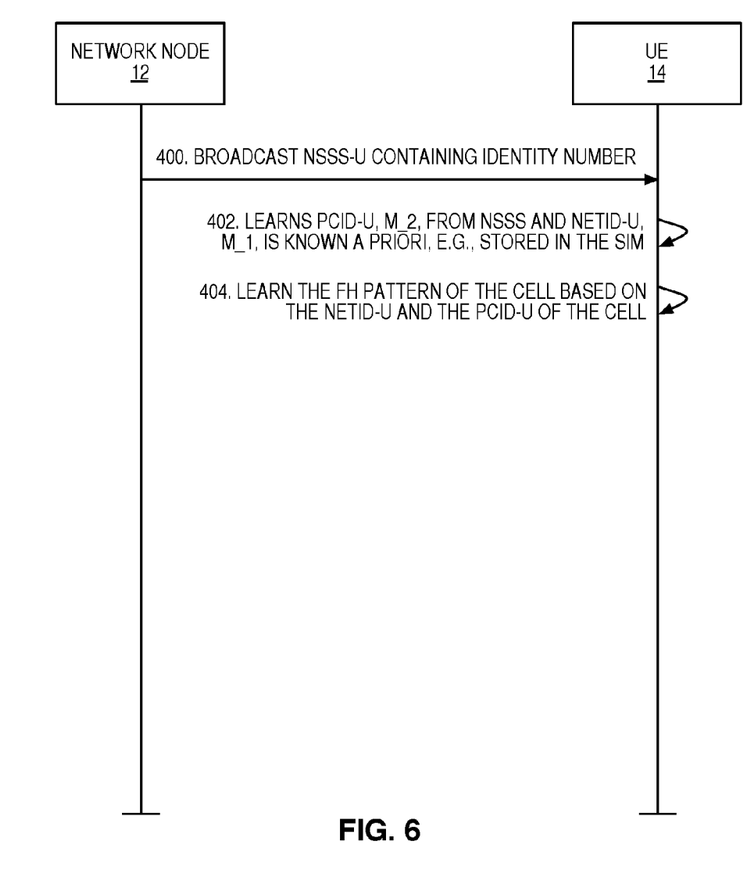

FIG. 6 illustrates processes for determining parameters of a cell according to some embodiments of the present disclosure. These embodiments support up to 504 PCID-U, and up to 504 NetID-U. In some embodiments, illustrated in FIG. 6, the network node 12 broadcasts a NSSS-U containing the PCID-U of the cell (step 400). The NSSS-U carries the information about PCID-U, $m_2$, reusing the same Rel-13 NSSS waveforms. The hopping pattern is determined based on $q=(m_1+m_2)$ modulo 504, where $m_1$ is the NetID-U. In this case, the UE 14 learns PCID-U, $m_2$, from NSSS-U, and uses its operator's NetID-U, $m_1$, which is known a priori, and, for example, stored in the SIM (subscriber identity module or subscriber identification module), implemented either in software or hardware (step 402), to figure out the value of hopping pattern q (step 404). If the NSSS-U is transmitted by another operator with a different NetID-U, e.g. $m_2'$, the hopping pattern $q=(m_1+m_2)$ modulo 504 determined by the UE 14 would be different from the hopping pattern, $q'=(m_1+m_2')$ modulo 504, used in the cell that transmits the received NSSS-U signal. The UE 14 will not be in synchronism with the hopping pattern used in the cell, and will not be able to read the master information block (MIB) successfully. In some embodiments, this allows the UE 14 to abort further reading the system information in this cell and continue to search for a cell that belongs to its subscribed network.

These formulas are merely one example and the current disclosure is not limited thereto. Given $m_1$, any one-to-one mapping from $m_2$ to hopping pattern is valid.

Some of the previous embodiments can be adapted to work with a number of hopping patterns that is fewer than 504. For example, if the number of hopping patterns is less than 504, the mapping presented above can be used to map the ID, 0, . . . , 503, signaled in NSSS-U to the hopping pattern. The PCID-U and NetID-U are determined based on the ID value carried in NSSS-U, e.g., by the method presented above. This creates a mapping between the combination of (PCID-U, NetID-U) and the hopping pattern.

Similarly, the modulo sum of $(m_1+m_2)$ modulo 504 discussed above can be used to determine a hopping pattern q based on:

$$q=((m_1+m_2) \text{modulo } 504) \text{modulo } K,$$

where K is the number of hopping patterns.

Figure 7:
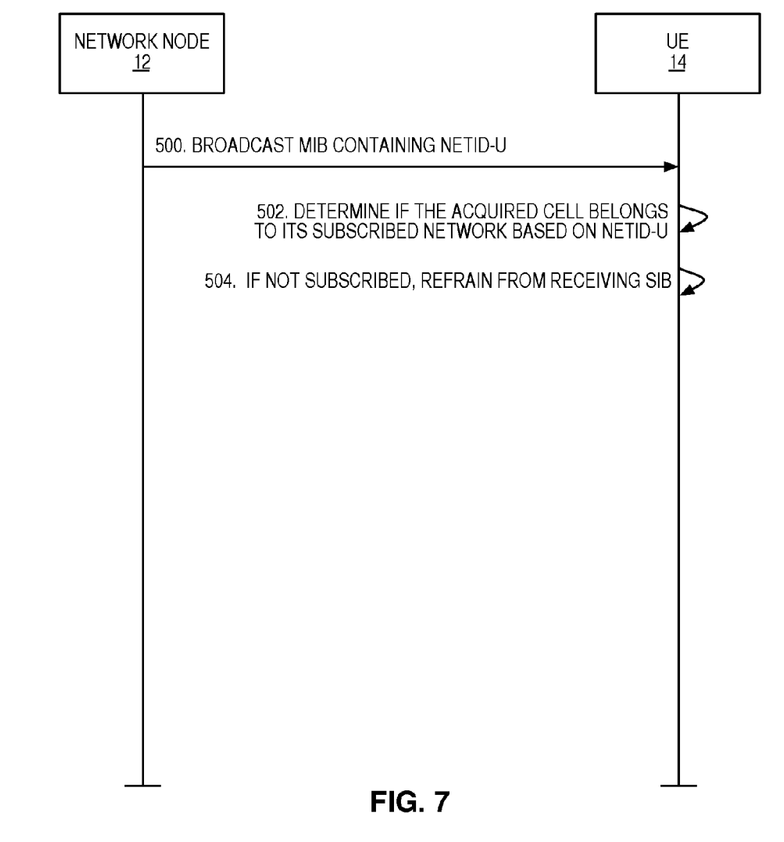

FIG. 7 illustrates processes for determining parameters of a cell according to some embodiments of the present disclosure. In some embodiments, the hopping pattern is only determined by PCID-U, not by NetID-U. In a legacy LTE system, the PLMN ID is carried in SIB Type1, known as SIB1. The initial system acquisition procedure requires the UE 14 to read MIB first to learn the scheduling information of SIB1. Thus, it takes additional time for the UE 14 to acquire the PLMN ID after acquiring the MIB. In some embodiments, illustrated in FIG. 7, in an NB-IoT-U system, the information about network identity, NetID-U is included as a part of MIB (step 500). This allows the UE 14 to identify whether the acquired cell belongs to its subscribed network (step 502) without potentially going through a lengthy reception of SIB1 if the UE 14 is in extremely coverage limited condition (step 504).

Combinations of one or more embodiments described above may also be considered.

Figure 8:
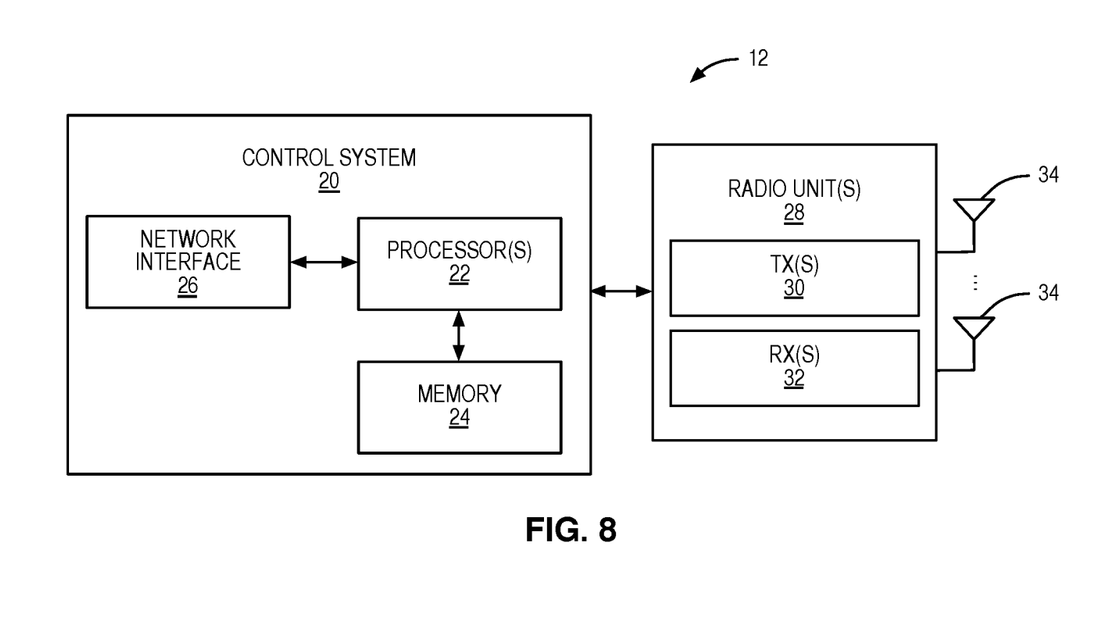
FIGS. 8 and 9 are diagrams of a network node according to some embodiments of the present disclosure.

FIG. 8 is a diagram of a network node 12 according to some embodiments of the present disclosure. In some embodiments, the network node 12 may be a base station such as an eNode B. As illustrated, the network node 12 includes a control system 20 that includes one or more processors 22 (e.g., Central Processing Units (CPUs), Application Specific Integrated Circuits (ASICs), Field Programmable Gate Arrays (FPGAs), and/or the like), memory 24, and a network interface 26. In addition, the network node 12 includes one or more radio units 28 that each includes one or more transmitters 30 and one or more receivers 32 coupled to one or more antennas 34. In some embodiments, the radio unit(s) 28 is external to the control system 20 and connected to the control system 20 via, e.g., a wired connection (e.g., an optical cable). However, in some other embodiments, the radio unit(s) 28 and potentially the antenna(s) 34 are integrated together with the control system 20. The one or more processors 22 operate to provide one or more functions of a network node 12 as described herein. In some embodiments, the function(s) are implemented in software that is stored, e.g., in the memory 24 and executed by the one or more processors 22.

Figure 9:
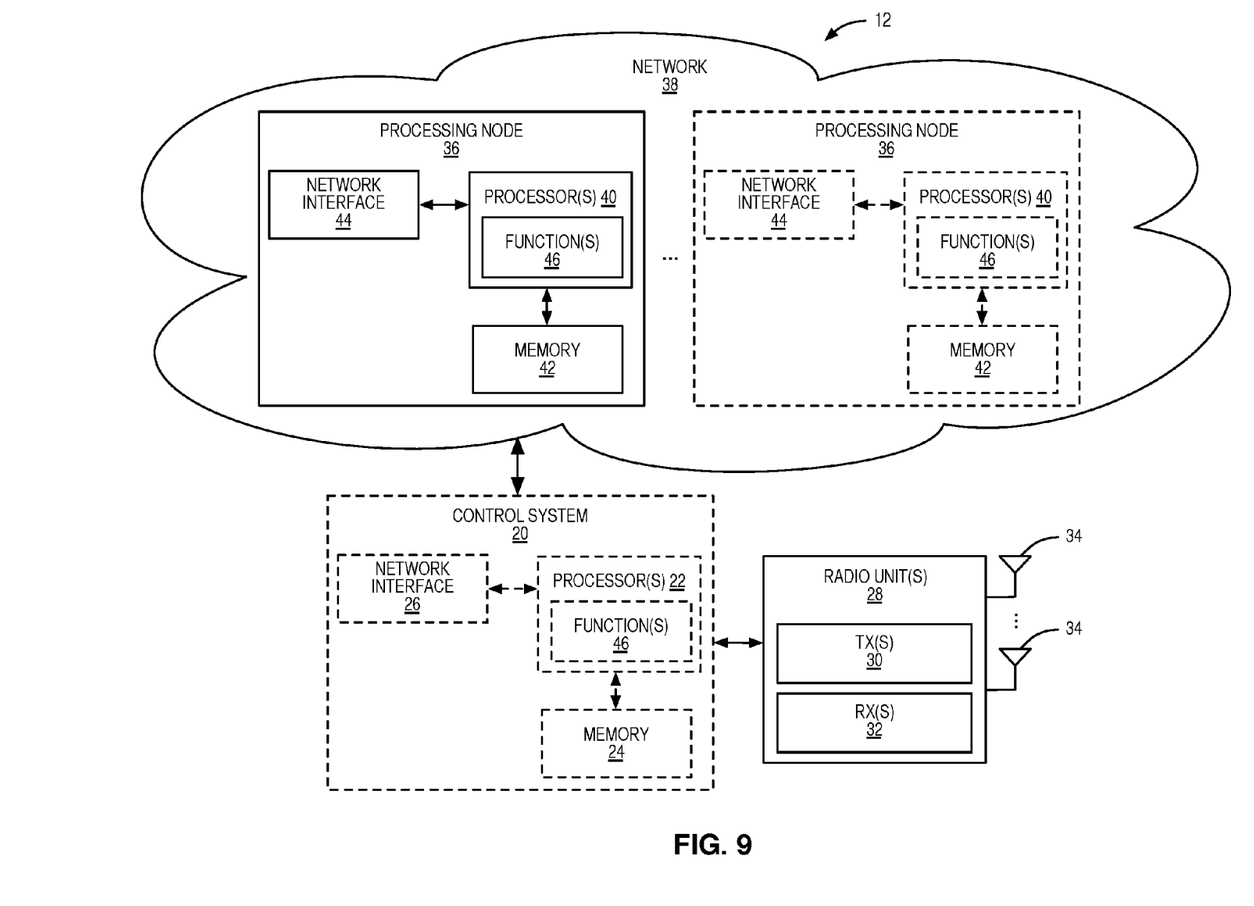

FIG. 9 is a schematic block diagram that illustrates a virtualized embodiment of the network node 12 according to some embodiments of the present disclosure. This discussion is equally applicable to other types of network nodes. Further, other types of network nodes may have similar virtualized architectures.

As used herein, a "virtualized" network node 12 is an implementation of the network node 12 in which at least a portion of the functionality of the network node 12 is implemented as a virtual component(s) (e.g., via a virtual machine(s) executing on a physical processing node(s) in a network(s)). As illustrated, in this example, the network node 12 includes the control system 20 (optional) that includes the one or more processors 22 (e.g., CPUs, ASICs, FPGAs, and/or the like), the memory 24, and the network interface 26 and the one or more radio units 28 that each includes the one or more transmitters 30 and the one or more receivers 32 coupled to the one or more antennas 34, as described above. The control system 20 is connected to the radio unit(s) 28 via, for example, an optical cable or the like. The control system 20 is connected to one or more processing nodes 36 coupled to or included as part of a network(s) 38 via the network interface 26. Each processing node 36 includes one or more processors 40 (e.g., CPUs, ASICs, FPGAs, and/or the like), memory 42, and a network interface 44.

In this example, functions 46 of the network node 12 described herein are implemented at the one or more processing nodes 36 or distributed across the control system 20 and the one or more processing nodes 36 in any desired manner. In some particular embodiments, some or all of the functions 46 of the network node 12 described herein are implemented as virtual components executed by one or more virtual machines implemented in a virtual environment(s)

hosted by the processing node(s) 36. As will be appreciated by one of ordinary skill in the art, additional signaling or communication between the processing node(s) 36 and the control system 20 is used in order to carry out at least some of the desired functions 46. Notably, in some embodiments, the control system 20 may not be included, in which case the radio unit(s) 28 communicate directly with the processing node(s) 36 via an appropriate network interface(s).

In some embodiments, a computer program including instructions which, when executed by at least one processor, causes the at least one processor to carry out the functionality of a network node 12 or a node (e.g., a processing node 36) implementing one or more of the functions 46 of the network node 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
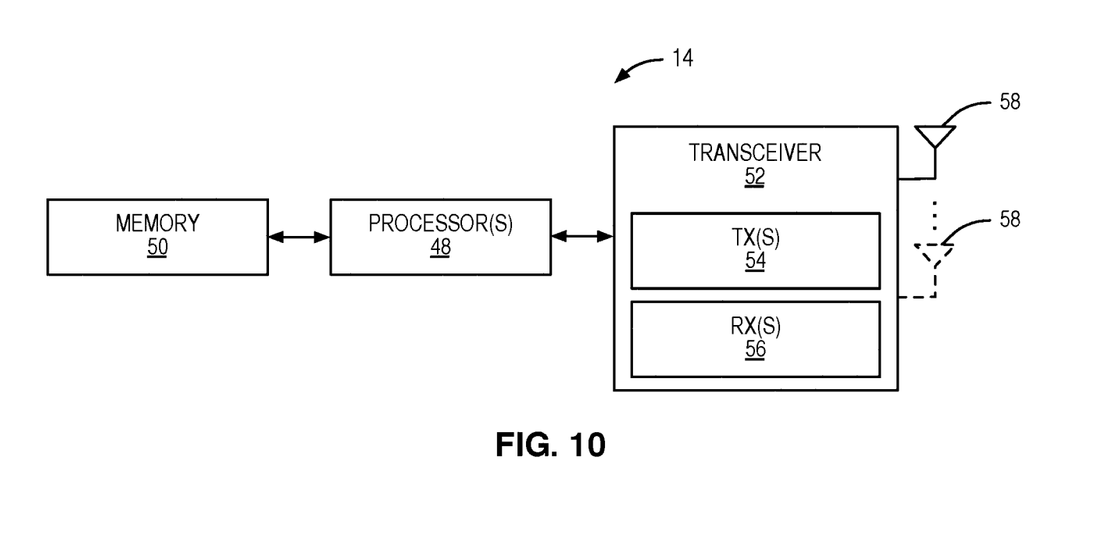
FIG. 10 is a diagram of a wireless device according to some embodiments of the present disclosure.

FIG. 10 is a diagram of a UE 14 according to some embodiments of the present disclosure. As illustrated, the UE 14 includes at least one processor 48 and memory 50. The UE 14 also includes a transceiver 52 with one or more transmitters 54, one or more receivers 56, and one or more antennas 58. In some embodiments, UE 14, or the functionality of the wireless device 14 described with respect to any one of the embodiments described herein, is implemented in software that is stored in, e.g., the memory 50 and executed by the processor 48. The transceiver 52 uses the one or more antennas 58 to transmit and receive signals and may include one or more components that connect the UE 14 to other systems.

In some embodiments, a computer program including instructions which, when executed by at least one processor 48, causes the at least one processor 48 to carry out the functionality of the UE 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 11:
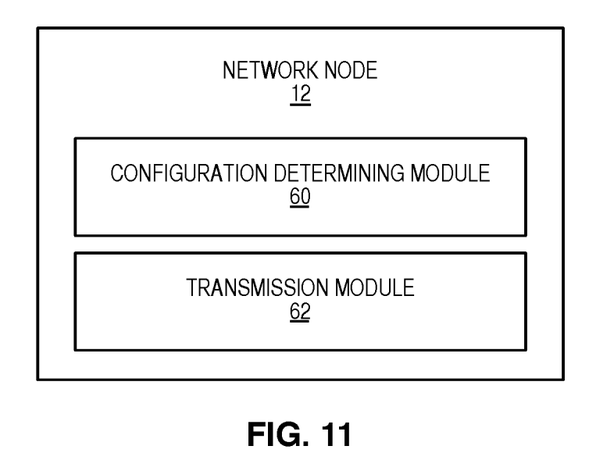
FIG. 11 is a diagram of a network node including modules according to some embodiments of the present disclosure.

FIG. 11 is a diagram of a network node 12 including modules according to some embodiments of the present disclosure. The configuration determining module 60 and the transmission module 62 are each implemented in software that, when executed by a processor of the network node 12, causes the network node 12 to operate according to one of the embodiments described herein.

Figure 12:
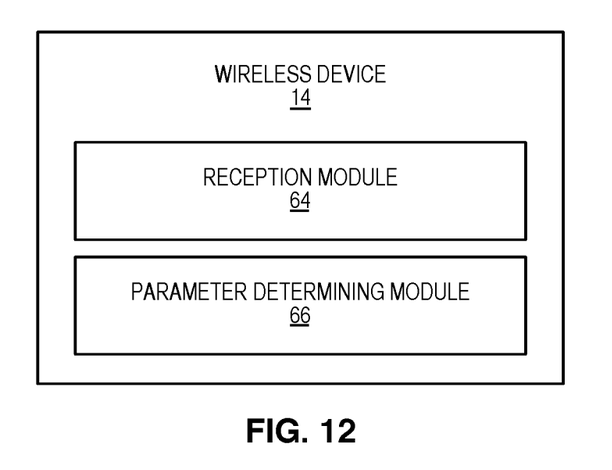
FIG. 12 is a diagram of a wireless device including modules according to some embodiments of the present disclosure.

FIG. 12 is a diagram of a UE 14 including modules according to some embodiments of the present disclosure. The reception module 64 and the parameter determining module 66 are each implemented in software that, when executed by a processor of the UE 14, causes the UE 14 to operate according to one of the embodiments described herein.

The following acronyms are used throughout this disclosure.

3GPP Third Generation Partnership Project
CA Carrier Aggregation
CC Component Carrier
CN Core Network
CPE Customer Premises Equipment
CPU Central Processing Unit
CRS Cell-Specific Reference Symbol
D2D Device-to-Device
dB Decibel
dBm Decibel-Milliwatt
DL Downlink
EIRP Equivalent Isotropically Radiated Power
eNB Enhanced or Evolved Node B
EPC Evolved Packet Core
E-UTRAN Evolved UMTS Radio Access Network
FCC Federal Communications Commission
FH Frequency Hopping
GHz Gigahertz
ID Identifier
IoT Internet of Things
ISM Industrial, Scientific, and Medical
kHz Kilohertz
LBT Listen-Before-Talk
LEE Laptop Embedded Equipment
LME Laptop Mounted Equipment
LTE Long Term Evolution
M2M Machine-to-Machine
MBMS Multimedia Broadcast/Multicast Service
MCE MBMS Coordination Entity
MHz Megahertz
MIB Master Information Block
MME Mobility Management Entity
ms Millisecond
MTC Machine Type Communication
NB-IoT Narrowband Internet of Things
NSSS Narrowband Secondary Synchronization Signal
PCC Primary Component Carrier
PCID Physical Cell Identity
PDCCH Physical Downlink Control Channel
PDN Packet Data Network
P-GW Packet Data Network Gateway
PLMN Public Land Mobile Network
PSC Primary Serving Cell
PSD Power Spectral Density
RAN Radio Access Network
Rel Release
RRC Radio Resource Control
RRH Remote Radio Head
RRU Remote Radio Unit
SCC Secondary Component Carrier
SFBC Space Frequency Block Code
SGSN Serving General Packet Radio Service Support Node
S-GW Serving Gateway
SIB System Information Block
SIM Subscriber Identity Module
SON Self-Organizing Network
SSC Secondary Serving Cell
UE User Equipment
UL Uplink
UMTS Universal Mobile Telecommunications System
US United States of America
USB Universal Serial Bus Those skilled in the art will recognize improvements and modifications to the embodiments of the present disclosure. All such improvements and modifications are considered within the scope of the concepts disclosed herein and the claims that follow.

What is claimed is:
1. A method of operating a wireless device in a wireless communication network, comprising:
obtaining a signal transmitted from a network node in the wireless communication network;

determining a physical cell Identifier, ID, of the network node based on the signal obtained from the network node;

determining a network ID of the network node based on the signal obtained from the network node; and in response to determining that the network ID is part of a network able to be accessed by the wireless device, determining a frequency hopping, FH, pattern of the network node based on the determined physical cell ID of the network node and the network ID of the network node.

2. The method of claim 1 wherein determining the FH pattern based on the physical cell ID comprises determining the FH pattern based on each physical cell ID corresponding to a unique FH pattern.

3. The method of claim 1 wherein there are 504 possible physical cell IDs and 504 corresponding FH patterns.

4. The method of claim 1 wherein determining the FH pattern based on the physical cell ID comprises determining the FH pattern based on at least two physical cell IDs corresponding to the same FH pattern.

5. The method of claim 4 wherein determining the FH pattern based on the physical cell ID comprises determining m % K=k where m is the physical cell ID, % is the modulo operator, K is a number of unique FH patterns, and k is the FH pattern associated with the physical cell ID.

6. The method of claim 1 further comprising:
in response to determining that the network ID is not part of a network able to be accessed by the wireless device, refraining from receiving a System Information Block, SIB, from the network node.

7. The method of claim 1 wherein obtaining the signal transmitted from the network node comprises obtaining a Master Information Block, MIB, that comprises the network ID of the network node.

8. The method of claim 1 wherein obtaining the signal transmitted from the network node comprises obtaining a Narrowband Secondary Synchronization Signal, NSSS, waveform used in an unlicensed spectrum.

9. The method of claim 1 wherein obtaining the signal transmitted from the network node comprises obtaining the signal in the 2.4 GHz Industrial, Scientific, and Medical, ISM, band.

10. The method of claim 1 wherein obtaining the signal transmitted from the network node comprises obtaining the signal in the 915 MHz Industrial, Scientific, and Medical, ISM, band.

11. A wireless device comprising:
at least one processor; and
memory containing instructions whereby the wireless device is operative to:
obtain a signal transmitted from a network node in a wireless communication network;
determine a physical cell identifier, ID, of the network node based on the signal obtained from the network node;
determine a network ID of the network node based on the signal obtained from the network node; and
in response to determining that the network ID is part of a network able to be accessed by the wireless device, determine a frequency hopping, FH, pattern of the network node based on the determined physical cell ID of the network node and the network ID of the network node.

12. The wireless device of claim 11 wherein being operative to determine the FH pattern based on the physical cell ID comprises being operative to determine the FH pattern based on each physical cell ID corresponding to a unique FH pattern.

13. The wireless device of claim 11 wherein there are 504 possible physical cell IDs and 504 corresponding FH patterns.

14. The wireless device of claim 11 wherein being operative to determine the FH pattern based on the physical cell ID comprises being operative to determine the FH pattern based on at least two physical cell IDs corresponding to the same FH pattern.

15. The wireless device of claim 14 wherein being operative to determine the FH pattern based on the physical cell ID comprises being operative to determine m % K=k where m is the physical cell ID, % is the modulo operator, K is a number of unique FH patterns, and k is the FH pattern associated with the physical cell ID.

16. The wireless device of claim 11 further operative to:
in response to determining that the network ID is not part of a network able to be accessed by the wireless device, refrain from receiving a System Information Block, SIB, from the network node.

17. The wireless device of claim 11 wherein being operative to obtain the signal transmitted from the network node comprises being operative to obtain a Master Information Block, MIB, that comprises the network ID of the network node.

18. The wireless device of claim 11 wherein being operative to obtain the signal transmitted from the network node comprises being operative to obtain a Narrowband Secondary Synchronization Signal, NSSS, waveform used in an unlicensed spectrum.

19. The wireless device of claim 11 wherein being operative to obtain the signal transmitted from the network node comprises being operative to obtain the signal in the 2.4 GHz Industrial, Scientific, and Medical, ISM, band.

20. The wireless device of claim 11 wherein being operative to obtain the signal transmitted from the network node comprises being operative to obtain the signal in the 915 MHz Industrial, Scientific, and Medical, ISM, band.

21. A method of operating a wireless device in a wireless communication network, comprising:
obtaining a signal transmitted from a network node in the wireless communication network;
determining a physical cell Identifier, ID, of the network node based on the signal obtained from the network node;
determining a frequency hopping, FH, pattern of the network node based on the determined physical cell ID of the network node and a predefined network ID for the wireless device; and
in response to determining that the determined FH pattern matches an actual FH pattern of the network node, determining that the network node is part of a network able to be accessed by the wireless device.

22. The method of claim 21 further comprising:
in response to determining that the determined FH pattern does not match the actual FH pattern of the network node, refraining from receiving a System Information Block, SIB, from the network node.

23. The method of claim 21 wherein obtaining the signal transmitted from the network node comprises obtaining a Master Information Block, MIB, that comprises a network ID of the network node.

24. The method of claim 21 wherein obtaining the signal transmitted from the network node comprises obtaining a Narrowband Secondary Synchronization Signal, NSSS, waveform used in an unlicensed spectrum.

25. The method of claim 21 wherein obtaining the signal transmitted from the network node comprises obtaining the signal in the 2.4 GHz Industrial, Scientific, and Medical, ISM, band.

26. The method of claim 21 wherein obtaining the signal transmitted from the network node comprises obtaining the signal in the 915 MHz Industrial, Scientific, and Medical, ISM, band.

* * * * *